United States Patent [19]

Frederiksen et al.

[11] Patent Number: 5,247,879
[45] Date of Patent: Sep. 28, 1993

[54] NUT CRACKING MACHINE

[76] Inventors: Wilfred C. Frederiksen, 16881 Bolero La., Huntington Beach, Calif. 92649; Sun Y. Kim, 2384 Lancaster Ct., Hayward, Calif. 94542

[21] Appl. No.: 880,002

[22] Filed: May 8, 1992

[51] Int. Cl.$^5$ ............................................. A23N 5/00
[52] U.S. Cl. ........................................ 99/575; 99/574; 99/579; 99/581
[58] Field of Search .......... 99/568, 571, 572, 574–576, 99/577–582; 426/482, 483

[56] References Cited

U.S. PATENT DOCUMENTS

| | | | |
|---|---|---|---|
| 1,342,692 | 6/1920 | Pape | 99/575 |
| 2,144,841 | 1/1939 | Glaser | 99/579 |
| 2,230,790 | 2/1941 | Anderson | 99/574 |
| 2,316,025 | 4/1943 | Smith | 99/574 |
| 2,549,881 | 4/1951 | Berg et al. | 99/579 |
| 4,201,126 | 5/1980 | Evans | 99/579 |
| 4,218,968 | 8/1980 | Livingston | 99/572 |
| 4,307,660 | 12/1981 | Clavel | 99/582 |
| 4,418,617 | 12/1983 | Quantz | 99/581 |
| 4,793,248 | 12/1988 | Frederikson et al. | 99/575 |
| 5,115,733 | 5/1992 | Frederikson et al. | 99/574 |

FOREIGN PATENT DOCUMENTS

| | | | |
|---|---|---|---|
| 2356380 | 1/1978 | France | 99/574 |
| 21978 | 4/1930 | Netherlands | 99/575 |

*Primary Examiner*—Timothy F. Simone
*Attorney, Agent, or Firm*—Bielen, Peterson & Lampe

[57] ABSTRACT

A nut cracking machine constructed with a cracking unit having a first reel of generally cylindrical configuration with a periphery having a series of uniformly spaced first cracking faces and a second reel of generally cylindrical configuration disposed within the first reel with a periphery having a series of uniformly spaced second cracking faces oppositely facing the first cracking faces, the first reel and second reel being rotated together on displaced axes that are parallel, the machine having a nut dispensing mechanism for dispensing nuts between the opposed cracking faces where the nuts are cracked as the reels rotate.

9 Claims, 4 Drawing Sheets

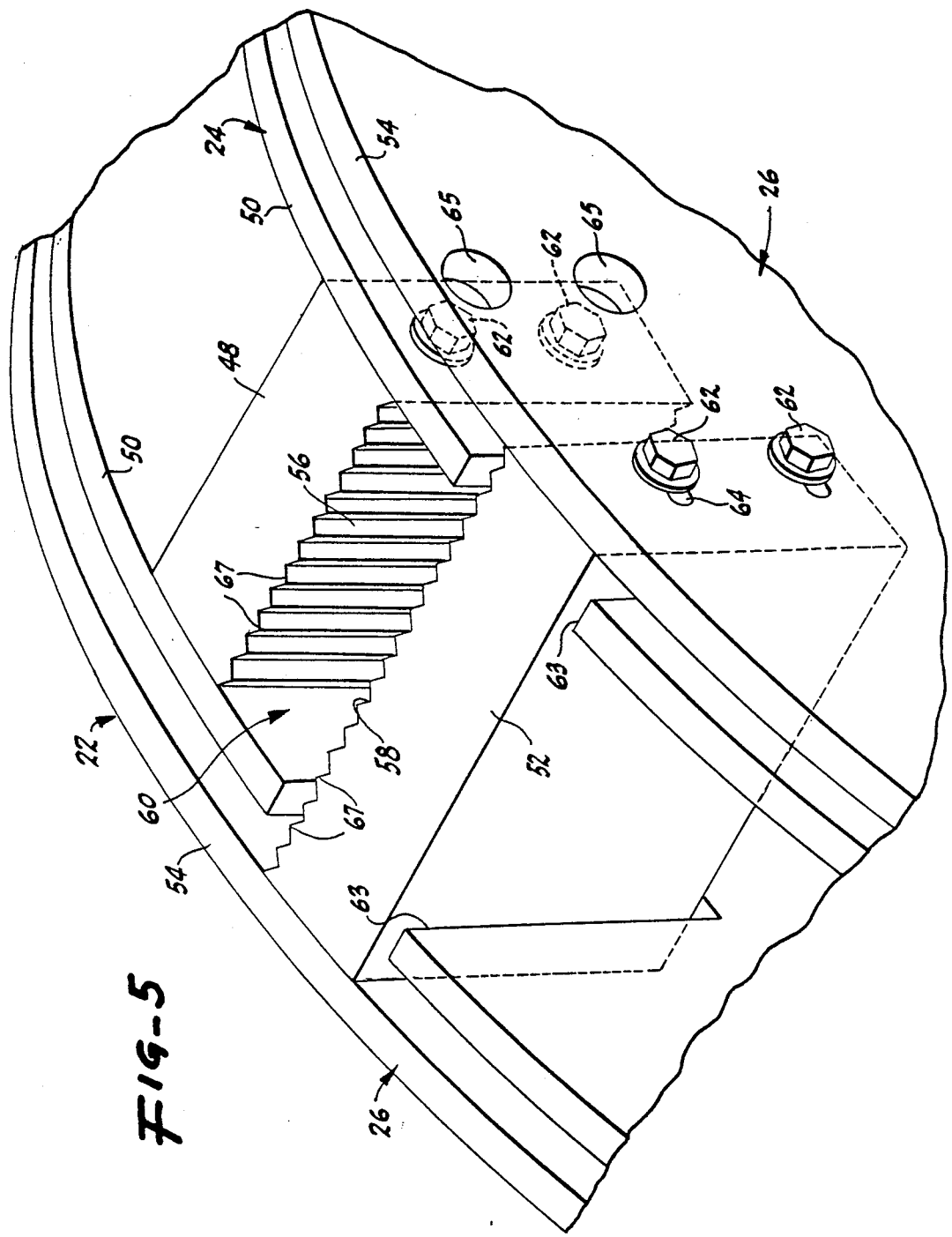

NUT CRACKING MACHINE

BACKGROUND OF THE INVENTION

This invention relates to a general purpose nut cracking machine that has particular application to the cracking of macadamia nuts, and other nuts that are problematical because of their hard shell or smooth surface. The nut cracking machine of this invention, relates to the nut cracking machines of our earlier issued U.S. Pat. No. 4,793,248 issued, Dec. 27, 1988, entitled, NUT SHELLING MACHINE, and our issued U.S. Pat. No. 5,115,733, issued May 26, 1992, entitled NUT SHELLING MACHINE, Both these previously developed machines were directed at the problem of efficiently shelling the macadamia nut with the objective of minimizing the damage to the meat of the nut.

These machines were also advantageously useable for other nuts, as is the subject machine. The machine of the '248 patent, utilized a metered feed mechanism to trap a nut between the counter rotating blades of a shell splitting mechanism. The shell splitting mechanism had blades that would engage the nut shell and split the shell with a shear action. The machine is particularly effective in producing shelled nuts with minimum crushing and damage to the surface of the meat. However, the operation of the machine is most effective when the nuts are of reasonably uniform size, such that the action of the rotating blades has a consistent effect on engaging and splitting the shell. Furthermore, because of the precision in which the nut must be lodged between the splitting blades of the referenced device, devising a mechanism that accurately situates the nut between the rotating blades becomes difficult. Finally, because of the particular construction of a hard-shelled macadamia nut, the shell is often split while leaving the meat attached to the shell. These difficulties have led to the development of newer machines for further optimizing production.

The nut cracking device of U.S. Pat. No. 5,115,733 resolves certain of the problems occasioned by the nut splitting device. The use of two plates mounted on skewed axes allowed nuts of greater dimensional variety in a batch to be cracked. Furthermore, the machine provided an efficient back-up to the shell splitting machine and operated as an efficient re-cracker for nuts that passed the shelling machine uncracked or insufficiently cracked to liberate the meat. However, the compression action by the opposed plates on the nuts tended to damage the meat more than necessary. Also, certain smooth surfaced, hard shelled nuts such as the macadamia, tended to escape the grip of the two plates and pass the process uncracked.

In order to combine the best features of the previously developed machines, applicants have devised an efficient nut shelling machine that is constructed to shell nuts using both a compressive and a shear force. The design of the nut cracking machine permits greater variations in size than does the nut splitting machines described above and is constructed to minimize precision in metering the feeding of nuts to the cracking unit. Finally the invented machine is constructed to inhibit escape of nuts before being shelled. The nut cracking machine is designed to operate on a wide variety of shelled nuts and is particularly adaptable for shelling the round, thick-shelled macadamia nut.

SUMMARY OF THE INVENTION

The nut shelling machine of this invention is designed to crack and shell a variety of different nuts and is designed to be tolerant of variations in size, such that large nuts and small nuts receive effectively the same proportionate compression and shear action for production of high quality, undamaged meat.

The nut cracking machine is constructed with a feed mechanism that is connected to a cracking unit for metering the delivery of nuts to the cracking unit. The metering device is capable of delivering several nuts at a time to the jaw openings of a rotating reel unit in the cracking mechanism. The unique construction of the reel unit provides a series of perimeter jaw openings into which the nuts from the metering mechanism are deposited on rotation of the reel unit. The reel unit includes a first inner reel assembly and a second outer reel assembly with each reel assembly providing one of the two jaw blocks in the series of paired blocks that form the perimeter jaw openings for crushing. Each reel assembly is rotated on an axis that is parallel but eccentric from the other such that upon rotation of the reel unit, the jaw blocks in each pair move toward and then away from one another. In addition, the eccentricity of the axes causes a slight radial displacement that produces a positive shearing action that is cumulative to the compression action for effective shelling of the nuts. The reel unit and the metering device can be advantageously rotated by a common drive motor enabling synchronous rotation of the metering device and the cracking unit.

By appropriate use of a common stationary shaft and eccentric journal sleeves adjustably connected to the shaft by set screws, the degree of eccentricity can be controlled. Furthermore, other adjustment mechanisms allow for adapting the cracking machine to different ranges of nut sizes and for different types of nuts where the optimum degree of displacement of the cracking jaws may differ. These and other features of the invention will be described in greater detail in the Detailed Description of the Preferred Embodiments.

BRIEF DESCRIPTION OF THE DRAWINGS

FIG. 5 is an enlarged perspective view of a sector of the reel unit shown partially broken-away from the reel unit of FIG. 3.

DETAILED DESCRIPTION OF THE PREFERRED EMBODIMENTS

Figure 1:
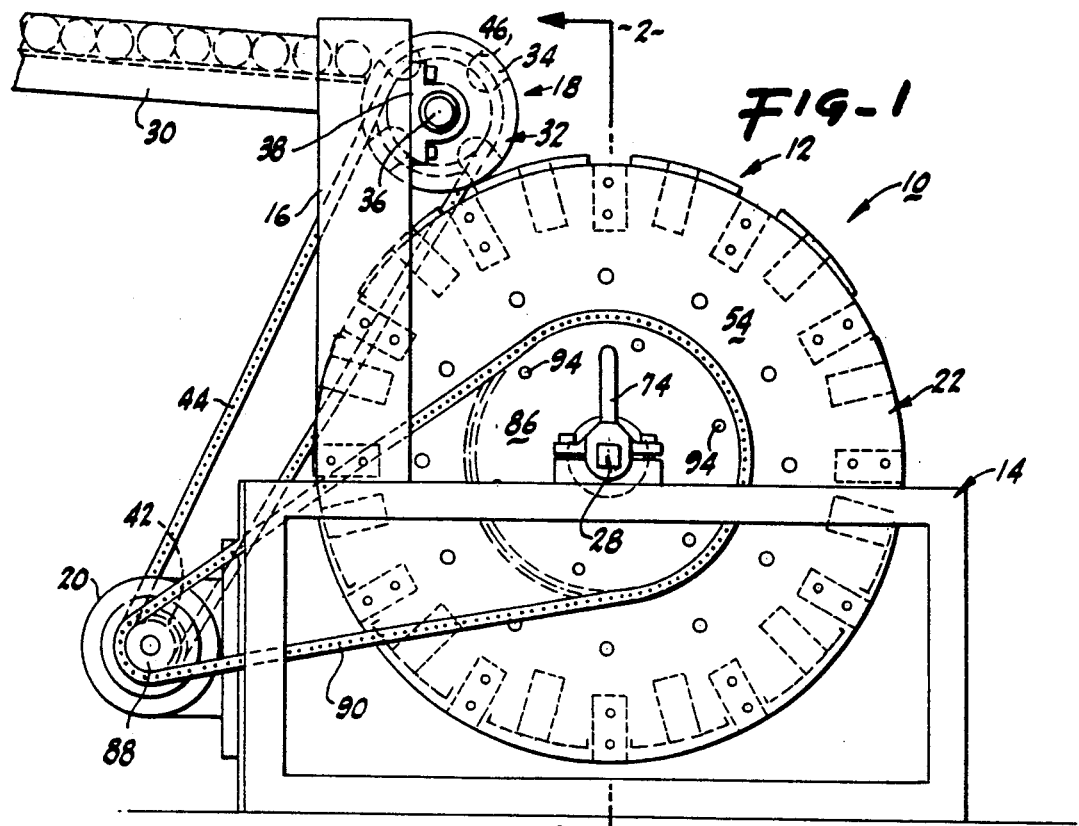
FIG. 1 is a side elevational view of the nut cracking machine.

The nut cracking machine of this invention, designated generally by the reference numeral 10, is shown in profile in FIG. 1. Referring to FIG. 1, the nut cracking machine 10 is constructed with a cracking mechanism 12 mounted on a support frame 14 constructed from steel box tube, having a frame extension 16 on which is mounted a feed mechanism 18. The cracking mechanism 12 and feed mechanism 18 are powered by a common geared drive motor 20, such that the operation of the feed mechanism 18 is synchronous with the operation of the cracking mechanism 12.

The cracking mechanism 12 has a reel unit 22 having an inner reel assembly 24 and an outer reel assembly 26 mounted on a common support shaft 28 in a manner described in greater detail with reference to FIG. 4, discussed hereinafter.

The feed mechanism 18 includes a vibratory feed tray 30 that funnels nuts toward a rotary dispenser 32 having a dispenser reel 34 mounted on a shaft 36 that is carried in a pair of journal bearings 38 that are bolted to the frame extensions 16 of the support frame 14. The rotary dispenser 32 includes a drive sprocket 40 mounted to the shaft 36 and connected to a drive sprocket 42, shown in phantom in FIG. 1, on the drive motor 20 by a drive chain 44. The dispenser reel 34 includes a series of peripheral rectangular pockets 46 into which one or more nuts is deposited from the feed tray 30 for metered transfer to the reel unit 22 of the cracking mechanism 12. Alternately, a hopper or other supply means can provide delivery of nuts to the dispenser 32 or directly to the reel unit 22 of the cracking mechanism 12.

Figure 3:
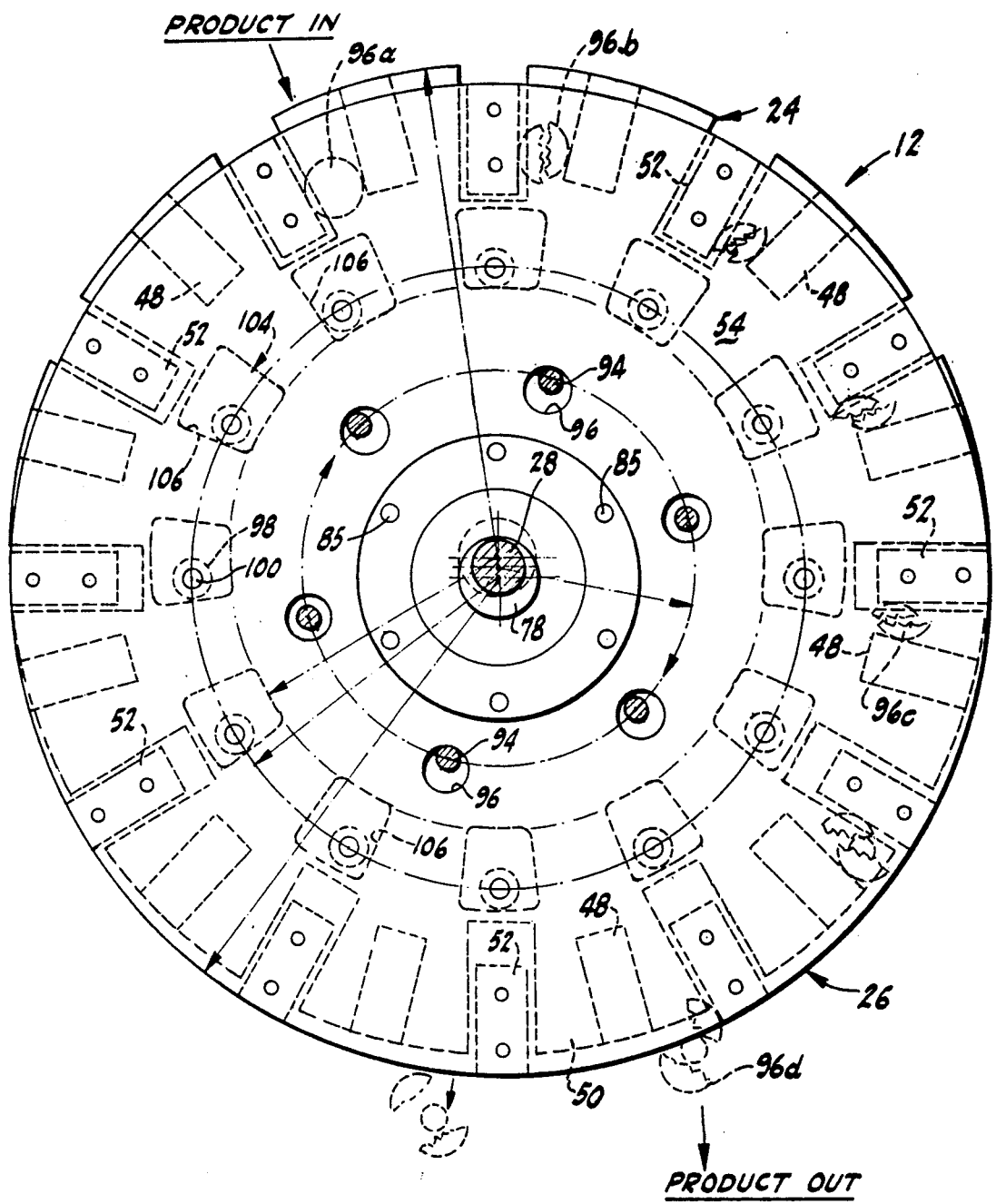
FIG. 3 is a partial cross sectional view of the reel unit taken on the lines 3—3 in FIG. 2.

The inner reel assembly 24 of the reel unit 22 has a series of cracking blocks 48 mounted to the periphery of two spaced, circular plates 50, shown in greater detail in FIG. 5. Similarly, a series of cracking blocks 52 are mounted between the periphery of circular outer plates 54 such that the cracking blocks 48 and 52 have opposed faces 56 and 58, respectively. Pairs of cracking blocks form cracking jaws 60 on the reel unit 22 into which nuts dispensed from the rotary dispenser 32 fall, as schematically illustrated in FIGS. 1 and 3. The cracking blocks 48 and 52 are secured to the respective plates 50 and 54 by bolts 62. The bolts 62 for the blocks 52 on the outer plates are secured through slots 64 to allow for gross adjustment of the spacing between pairs of the inner blocks 48 and the outer blocks 52. Access holes 65 in the outer plates 54 allow access to the bolts 62 securing the blocks 48 to the inner plates 50. The blocks 48 and 52 are generally rectangular in configuration and oriented on the plates substantially radially from their respective plate centerlines. A slight off-set from the block centerline improves the coaction of the block at their faces by reducing or increasing the effective angle between faces for a given disk radius. The faces 56 and 58 of the blocks 48 and 52 are preferably grooved to form V-shaped ridges 67 that are generally radially oriented as shown in FIG. 5. Slight canting to reduce the angle between faces may be desirable for nuts of relatively uniform size with thick, smooth shells, such as the macadamia nut. Alternate facing patterns may be included such as the addition of horizontal serrations (not shown) to prevent particularly smooth surfaced nuts from unwanted displacement on compression between the blocks 48 and 52 during operation of the cracking mechanism 12.

As shown in FIG. 5, the inner plates 50 have a large notch 63 that is oversized to accommodate the cracking block 52 mounted to the outer plates 54 such that displacement of the inner reel assembly 24 from the outer reel assembly 26 can be accomplished without the blocks 52 connected to the outer plates 54 interfering with the rotation of the inner reel assembly 24.

Figure 2:
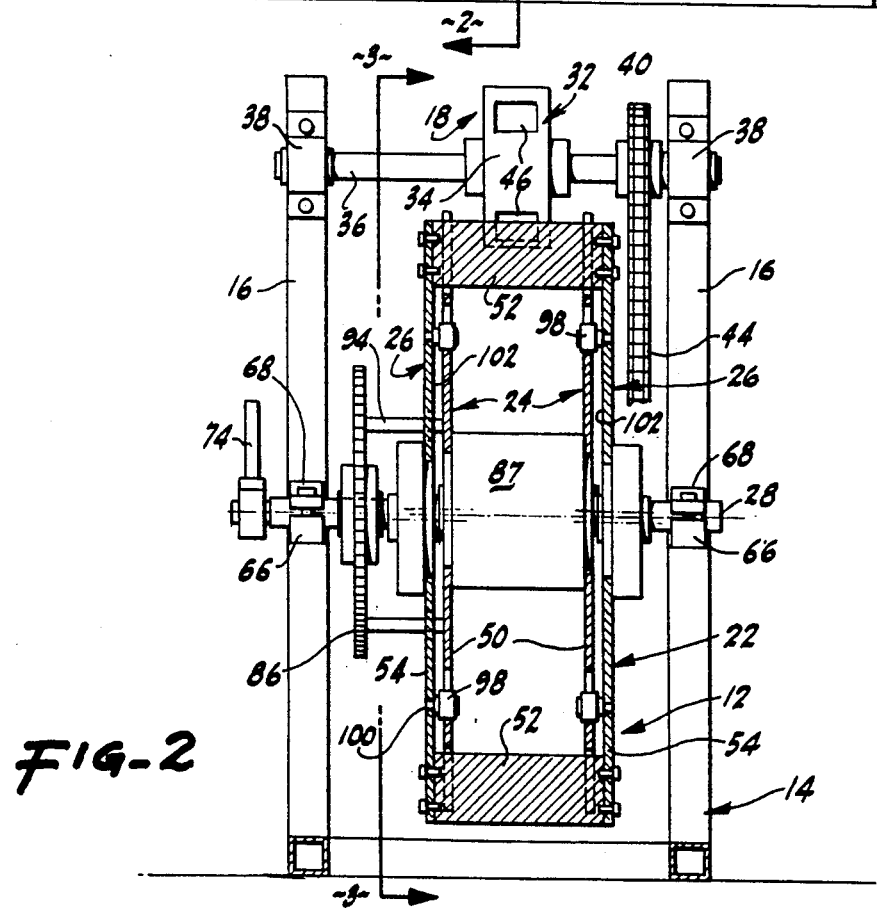
FIG. 2 is a cross sectional view of the machine taken on the lines 2—2 in FIG. 1.
Figure 4:
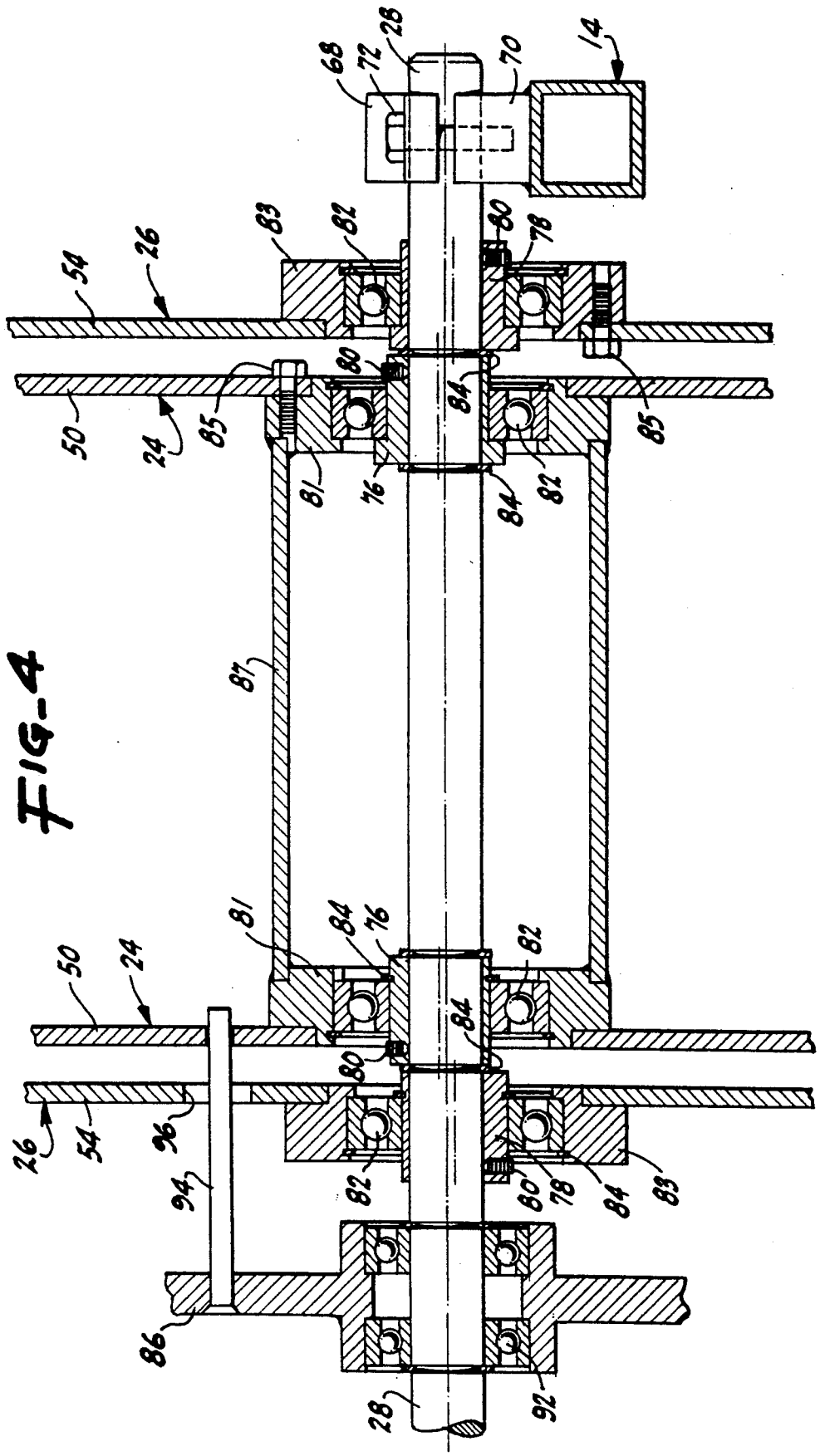
FIG. 4 is an enlarged cross sectional view with the shaft assembly of the reel unit of FIG. 3.

Referring now to FIGS. 2-4, the operation of the cracking mechanism 12 can be considered. The common shaft 28 is supported in a pair of clamping blocks 66 mounted on the support frame 14. The clamping blocks 66 each include a crown 68 that is connected to a cradle 70 by bolts 72 which can be tightened to adjust the friction grip of the clamping block 66 on the shaft 28. The friction grip is maintained at a level that maintains the shaft 28 motionless except when adjusted by a lever 74 connected to the end of the shaft 28 as shown in FIG. 2.

Mounted on the shaft 28 are a pair of inner sleeves 76 and outer sleeves 78 that have a cylindrical outside surface which is eccentric to the axis of the hollow inside surface that slips over the shaft 28. The sleeves can be adjusted in angular position and secured to the shaft by set screws 80. The sleeve pairs, 76 and 78 are adjusted such that the inner reel assembly 24 and the outer reel assembly 26 are eccentric to one another when hubs 81 and 83 connected to plate pairs 50 and 54 are mounted on roller bearings 82 carried on the respective sleeves 76 and 78. The sleeves 76 and 78 and bearings 82 are maintained in position along the longitudinal axis of the support shaft 28 by C-clips 8 to facilitate assembly and disassembly for maintenance and repair. The plate pairs 50 and 54 are connected to the hubs 81 and 83 by bolts 85. The inner plate hubs 81 have an interconnecting cylindrical casing 87, which adds structural integrity to the assembly and shields the inner workings from crushed nut detritus.

Also connected to the stationary, but adjustable support shaft 28 is the drive sprocket 86 for the cracking mechanism. The drive sprocket 86 is connected to a motor sprocket 88 on the geared drive motor 20 by a drive chain 90, as shown in FIG. 1. A drive sprocket 86 is seated on a roller bearing 92 and connected to the inner reel assembly 24 by a series of strut pins 94, which pass through clearance apertures 96 in the outer plates 54 of the outer reel assembly 26. In this manner, the inner reel assembly becomes the drive reel assembly and the outer reel assembly becomes the follower reel assembly. The interconnection between the inner and outer reel assemblies 24 and 26, is accomplished by a series of displaced follower cams 98 mounted on pins 100 that are fixed to the inside surface 102 of the outer plates 54 of the outer reel assembly 26. The cams 98 engage a cam surface 106 formed by trapezoidal apertures 104 in the inside plates of the inner reel assembly 24, as shown in FIGS. 3 and 4. At least one of the follower cams 98 is in contact with the cam surface 106 of the trapezoidal aperture 104, as shown in FIG. 3. The eccentric orientation of the axis of the inner reel assembly in relation to the orientation of the parallel axis of the outer reel assembly produces a relative motion between the two reel assemblies that is illustrated, most clearly in FIG. 3.

As the eccentrically mounted reel assemblies 24 and 26 rotate as a reel unit 22, the relative distance between jaw blocks changes. This change provides a compression or squeezing action to the shells of nuts lodged between the jaw blocks as shown in FIG. 3. In addition to the displacement toward and away from one another, the eccentric rotation of the coupled reel assemblies, 24 and 26 causes a radial displacement. The radial displacement imparts a rolling or shear action in addition to the compression action between adjacent jaw blocks. As shown in the example of FIG. 3, slightly exaggerated for effect, a nut 96a is deposited whole between jaw blocks in a angular position where the adjacent jaw blocks are substantially at maximum separation. As the jaw blocks are substantially radially oriented, they form a funnel-like opening to the jaw such that the nut lodges at a position in contact with both adjacent jaws depending on the size of the nut. As the reel unit 22 rotates and the relative distance between adjacent jaws diminishes, the nut begins to be compressed and cracked as shown in the second position of the schematic illustration of an exemplar nut 96b in FIG. 3. As the reel unit continues to rotate, the shear action and compression continues until a minimum spacing between the jaw blocks is achieved at approximately a quarter turn as shown for the nut 96c. From this point, the jaws begin to separate allowing the nut 96d and meat to fall out from between the jaws to a collection device (not shown). The combination of the shear action and compression action on the nut is particularly effective when the surface of the jaw blocks are grooved as shown in FIG. 5.

In practice, the weight of each reel assembly is sufficient to prevent separation of the jaws during the compression process, except in extreme circumstances where, for example, a rock is lodged between jaws. In a system where the weight of the reel assembly is insufficient to provide the inertial forces for compression, the addition of connecting springs (not shown) between the inner and outer reel assembly can be included to provide a calculated bias without sacrificing the safety feature of permitting retraction on encountering excessive resistance.

In order to adjust the device for particular types of nuts or size ranges, the device includes several means of adjustment. The adjustment slots 64 allows for major adjustments in the relative positioning of the blocks and is used during setup to accommodate the particular nut being cracked. Adjustment of the relative eccentricity of the inner reel assembly in respect to the outer reel assembly is accomplished by adjusting the set screws that lock the inner sleeve 76 and outer sleeve 78 to the support shaft 28. This adjusts the cycle displacement of the blocks and is also done during set-up. Finally, for minor adjustments, the hand lever 74 can be utilized to rotate the shaft 28 to angularly reposition the reel unit 22 with respect to the feed mechanism 18 such that the nuts can be fed to the reel unit 22 at less than the maximum separation of the jaws. For example, where a harvest has a predominance of particularly small nuts, the deposit of the nuts into the reel unit can be made at a position where the jaw blocks closer together than usual. This adjustment is usually reserved for tuning the machine during operation.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A nut cracking machine comprising:
a cracking unit having a first reel of generally cylindrical configuration with an axis and a periphery with a plurality of spaced first cracking faces displaced from the axis of the first reel and radially disposed around the periphery of the first reel, with the first cracking faces oriented substantially radial to the axis of the first reel;
a second reel of generally cylindrical configuration with an axis and a periphery with a plurality of spaced second cracking faces displaced from the axis of the second reel and radially disposed around the periphery of the second reel with the second cracking faces oriented substantially radial to the axis of the second reel, the second cracking faces in the second reel being in alternating disposition with the first cracking faces, wherein pairs of opposed first and second cracking faces form spaced cracking jaws, and means for rotating the first reel about its axis and the second reel about its axis with the second axis being displaced from and parallel to the first axis and the first and second cracking faces being substantially radially disposed from both reel axes, wherein the opposed cracking faces in opposed pairs move toward and away from one another.

2. A nut cracking machine comprising:
a cracking unit having a first reel of generally cylindrical configuration with an axis and a periphery with a plurality of spaced first cracking faces displaced from the axis of the first reel and radially disposed around the periphery of the first reel;
a second reel of generally cylindrical configuration with an axis and a periphery with a plurality of spaced second cracking faces displaced from the axis of the second reel and radially disposed around the periphery of the second reel in alternating disposition with the first cracking faces, wherein pairs of opposed first and second cracking faces form spaced cracking jaws, and means for rotating the first reel about its axis and the second reel about its axis with the second axis being displaced from and parallel to the first axis, wherein the opposed cracking faces in opposed pairs move toward and away from one another, and
wherein the cracking unit includes a frame and the frame supports a cylindrical shaft, the shaft having means for rotating the first reel and the second reel on parallel, eccentric axes.

3. The nut cracking machine of claim 2 wherein the shaft means includes cylindrical sleeves having a cylindrical inside surface and a cylindrical outside surface, the inside surface being eccentric to the outside surface, wherein the reels have a hubs with bearing means engageable with the sleeves and wherein the shaft has a cylindrical outside surface engageable with the inside surface of the sleeves.

4. The nut cracking machine of claim 3 wherein the shaft means includes adjustment means for coupling sleeves engageable with the hub of the first reel in a first position on the shaft and for coupling sleeves engageable with the hub of the second reel in a second position on the shaft angularly displaced from the first position, wherein on rotation of the reel unit, the first reel rotates about a first axis and the second reel rotates about a second axis.

5. The nut cracking machine of claim 4 having means connected to the shaft for angularly displacing the effective displacement of cracking surfaces.

6. The nut cracking machine of claim 1 in combination with nut dispensing means for dispensing nuts to the jaws of the cracking unit during rotation of the cracking unit.

7. The nut cracking machine of claim 6 having further, drive means for synchronously operating the dispensing means and cracking unit.

8. A nut cracking machine comprising:
a cracking unit having a first reel of generally cylindrical configuration with an axis and a periphery with a plurality of spaced first cracking faces displaced from the axis of the first reel and radially disposed around the periphery of the first reel;

a second reel of generally cylindrical configuration with an axis and a periphery with a plurality of spaced second cracking faces displaced from the axis of the second reel and radially disposed around the periphery of the second reel in alternating disposition with the first cracking faces, wherein pairs of opposed first and second cracking faces form spaced cracking jaws, and means for rotating the first reel about its axis and the second reel about its axis with the second axis being displaced from and parallel to the first axis, wherein the opposed cracking faces in opposed pairs move toward and away from one another, and wherein the first reel has means connecting it to the second reel for coordinated rotation of the first reel and second reel, the opposed cracking faces in spaced jaws having a cycled displacement toward and away from one another.

9. The nut cracking machine of claim 8 wherein the connecting means comprises a series of radially disposed cam followers on one reel and a series of radially disposed cam driver surfaces on the other reel in selective engagement with the cam followers.

* * * * *